Oct. 5, 1965    G. H. COTTER ETAL    3,210,213
WELDING ELECTRODE
Filed Dec. 4, 1961
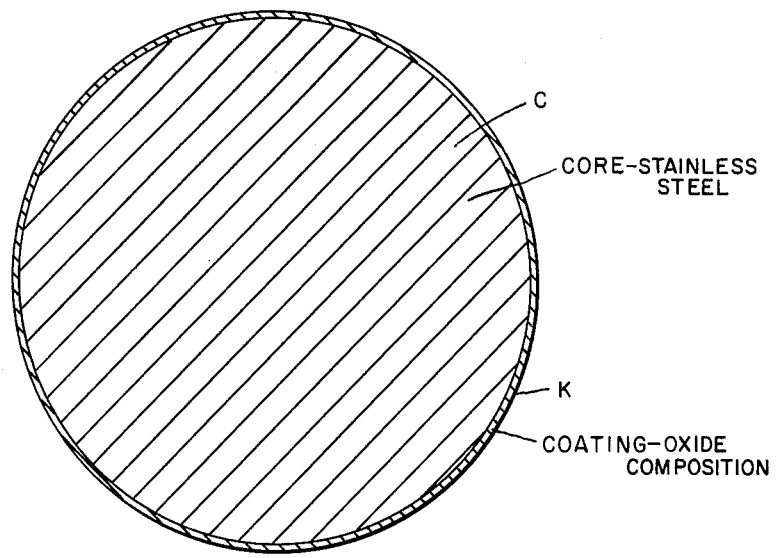
INVENTORS
George H. Cotter
and Howard C. Ludwig.
BY
ATTORNEY

United States Patent Office 3,210,213
Patented Oct. 5, 1965

3,210,213
WELDING ELECTRODE
George H. Cotter, Monroeville, and Howard C. Ludwig, Pittsburgh, Pa., assignors to Westinghouse Electric Corporation, East Pittsburgh, Pa., a corporation of Pennsylvania
Filed Dec. 4, 1961, Ser. No. 157,003
3 Claims. (Cl. 117—205)

This invention relates to the arc welding art and has particular relationship to consumable electrodes for arc welding.

A demand has arisen for arc welding stainless steel both for the purpose of overlaying materials of other compositions than stainless steel and also for fabricating purposes. Stainless steel can be welded with a manual electrode with the proper flux coating but in many situations, it is essential that the welding be carried out automatically or semi-automatically with a continuously supplied welding electrode. It is broadly an object of this invention to provide such an electrode for welding stainless steel continuously.

In accordance with the teachings of the prior art, attempts have been made to weld stainless steel in a shield of gas with a continuously supplied bare electrode composed of stainless steel. Where this welding was carried out in a shield of pure inert gas difficulty was encountered in maintaining an arc. The arc stability and the welding is improved for a bare electrode where the shield is a mixture of inert gas and a small quantity of the order of 3% by volume, of oxygen. But the welding in argon-oxygen atmosphere has not produced the desired stability for many purposes. It is another object of this invention to provide a continuous electrode for arc-welding stainless steel in a shield of gas and specifically in an inert gas or in a mixture of an inert gas and oxygen.

In accordance with this invention a continuous stainless steel electrode is provided which includes a core of stainless steel coated with a thin coating of a material having substantially the following composition by weight:

| | Percent |
|---|---|
| Titanium dioxide | 65 |
| Manganese dioxide | 20 |
| Calcium oxide | 15 |

The coating should be sufficient to stabilize the arc but should not oxidize the weld so as to produce appreciable porosity. The coating does not measurably change the diameter of the electrode. The coating may be deposited with the apparatus, and by the practice of the methods disclosed in Cotter Patent 2,883,306. The properties and thickness of the coating should be as taught by the Cotter patent and by Ludwig Patent 2,818,353.

A number of electrodes having cores of different compositions have been produced in the practice of this invention. Arc welding has been carried out with the electrodes in each case in a shield of commercial welding-grade (at least 99.98% pure) argon and also M1 gas which is a mixture of welding grade argon and 1% of oxygen by volume. In each case the welds were sound and free of porosity.

EXAMPLE I

About 10 pounds of wire of AISI–347 composition, $\frac{1}{16}$ inch diameter, were coated with the above-described coating using the apparatus and methods disclosed in the Cotter patent. The resulting electrode was used in arc-welding at straight polarity in a shield of welding-grade argon. The welding arc was stable, the bead contour and penetration of the resulting welds were good; the burn-off rate and penetration was satisfactory; the welds were sound.

EXAMPLE II

About 20 pounds of wire of AISI–308 compositions, $\frac{1}{16}$ inch diameter, were coated as described in Example I. The resulting electrode was used in welding as disclosed above and the welding operation and welds were equally satisfactory.

Both AISI–347 and AISI–308 include about 10% nickel, 20% chromium, 1.5% manganese, .5 to 1% silicon, .05% carbon. AISI–347 includes about .8 to 1% columbium.

Additional examples are presented in the following Tables I, II, III. Table I presents the compositions of the cores of the coated electrodes and of the deposits produced, the balance of the composition being substantially all iron. The cores are identified by heat-numbers; these identifications are given to the various compositions by the divisions of Westinghouse Electric Corporation which produce the heats or melts. The identification bearing the prefix VM means that the heat is vacuum melted to minimize the content of oxygen and nitrogen. In all cases the core and electrode had a diameter of $\frac{1}{16}$ inch.

Table II presents the welding parameters for the various welds that were produced. The welds are identified in the left-hand column.

*Table I.—Core and weld deposit composition*

| Core Heat | | Cr | Ni | Mn | Si | Mo | C | N | Ta | V | B | Zr | $O_2$ |
|---|---|---|---|---|---|---|---|---|---|---|---|---|---|
| 7393 | Core | 16.4 | 14.0 | 12.3 | (.15) | 1.48 | | | | | | | |
| | Deposit | 16.9 | 13.2 | 9.69 | .19 | 1.25 | .023 | .046 | | | | | |
| 7395 | Core | 16.3 | 13.9 | 12.3 | (.15) | 1.46 | | | .66 | | | | |
| | Deposit | 16.5 | 14.0 | 11.7 | .15 | 1.47 | .011 | .038 | .45 | | | | |
| 7487 | Core | 16.6 | 20.7 | 11.5 | 0.9 | 2.14 | .035 | .15 | | .34 | .006 | .011 | |
| | Deposit | 16.5 | 20.7 | 11.5 | .12 | 2.09 | .035 | .12 | | .28 | .0038 | .0052 | |
| VM205 | Core | 16.0 | 20.0 | 1.45 | | | .012 | .016 | | | | | .0037 |
| | Deposit | | | 1.40 | | | .0034 | .0076 | | | | | .040 |
| VM253 | Core | 16.3 | 20.1 | | | | .124 | .0027 | | | | | .030 |
| | Deposit | | | | | | .096 | .0049 | | | | | .021 |

*Table II.—Welding parameters*

| Weld No. | Electrode Identified by Core Heat | Current, Amperes | Voltage, Volts | No. of Passes | Work | Work Thickness, inch | Wire Speed In./Min. | Atmosphere | Cu. Ft./Hr. | Polarity |
|---|---|---|---|---|---|---|---|---|---|---|
| 144 | 7393 | 280 | 24 | 3 | AISI 304 | ¾ | | Argon | 40 | Straight. |
| 144A | 7393 | 280 | 27 | 4 | AISI 304 | ¾ | | M-1 | 35 | Reverse. |
| 144B | 7393 | 280 | 24 | 3 | Heat MM1990 | ¾ | | Argon | 40 | Straight. |
| 145 | 7393 | 305 | 27 | 3 | Heat 7392 | ⅝ | | M-1 | 35 | Reverse. |
| 150-1 | 7393 | 310 | 28 | 4 | Heat XMM2009 | ¾ | | M-1 | 35 | Do. |
| 150-2 | 7393 | 260 | 28 | 4 | Heat XMM2009 | ¾ | | M-1 | 35 | Do. |
| 146 | 7395 | 300 | 27 | 3 | Heat 7394 | ⅝ | | M-1 | 35 | Do. |
| 150-3 | 7395 | 280 | 27 | 4 | Heat XMM2009 | ¾ | | M-1 | 35 | Do. |
| 150-4 | 7395 | 255 | 26 | 4 | Meat XMM2009 | ¾ | | M-1 | 35 | Do. |
| 147A | 7395 | 285 | 28 | 4 | Heat XMM2009 | ¾ | | M-1 | 35 | Do. |
| 230 | 7487 | 300 | 28.5 | 6 | Heat XMM2009 | ¾ | | Argon | 35 | Straight. |
| 116 | VM205 | 325 | 28.5 | 5 | Heat VM205 | ⅝ | 230 | Chamber | | Do. |
| 128 | VM253 | 325 | 26 | 6 | Heat VM253 | ⅝ | 247 | Chamber | | Do. |

*Table III.—Room temperature—Tensile properties*

| Weld No. | Electrode Identified by Core Heat | Strength, p.s.i. 0.2% Yield | Strength, p.s.i. Ultimate | Total Elongation, Percent | Reduction of of Area, Percent | Heat Treatment |
|---|---|---|---|---|---|---|
| 150-1 | 7393 | 36,700 | 69,500 | 50.0 | 69.2 | As welded. |
| 144 | 7393 | 31,500 | 68,700 | 56.1 | 64.0 | 1 hr. 2,000° F. |
| 150-3 | 7395 | 40,200 | 72,500 | 51.7 | 68.6 | As welded. |
| 146 | 7395 | 30,000 | 67,200 | 50.2 | 68.0 | 1 hr. 2,000° F. |
| 230 | 7487 | 51,300 | 87,600 | 46.6 | 64.9 | As welded. |
| 116 | VM253 | 29,200 | 56,100 | 39.2 | 50.8 | Do. |
| 128 | VM205 | 40,800 | 67,200 | 29.0 | 39.9 | Do. |

The welds were deposited in a groove in a plate of the material identified as "Work" in Table II. All of the welds except 116 and 128 were made with a gun for gas shielded welding in open air. Welds 116 and 128 were made in a vacuum chamber evacuated to about $10^{-3}$ millimeter of mercury before refilling with welding-grade argon which also flowed slowly through the chamber during welding.

All welds were sound; they were essentially porosity free and crack free, their bead contour and penetration were good. Table III shows the tensile properties of certain of the welds wherein the degree of soundness is demonstrated by the excellent ductilities.

A typical electrode in accordance with this invention is shown in the single figure of the attached drawing.

The electrode shown in the drawing includes a core C of the composition described above and a thin coating K of the above-described oxides.

While preferred embodiments of this invention were disclosed herein, many modifications thereof are feasible. This invention then is not to be restricted except insofar as is necessitated by the spirit of the prior art.

We claim as our invention:

1. A consumable electrode for arc welding including a core having essentially the following composition:

Chromium—about 16 to 17%
Nickel—about 13 to 21%
Manganese—about 9 to 12.5%
Molybdenum—about 1.25 to 2.5%
Carbon—about .05% maximum
Silicon—about .5% maximum
Iron—remainder having thereon a thin arc stabilizing coating substantially of the following composition by weight:

Titanium dioxide—65%
Manganese dioxide—20%
Calcium oxide—15%

2. A consumable electrode for arc welding including a core having essentially the following composition:

Chromium—about 20%
Nickel—about 10%
Manganese—about 1.5%
Silicon—about .5 to 1%
Carbon—maximum about .05%
Columbium—up to about 1%
Iron—remainder and having thereon a thin arc-stabilizing coating substantially of the following composition:

Titanium dioxide—65%
Manganese dioxide—20%
Calcium oxide—15%

3. A consumable electrode for arc welding including a core having essentially the following composition:

Chromium—about 16 to 20%
Nickel—about 10 to 21%
Manganese—about 1.5 to 12.5%
Molybdenum—about 0 to 2.5%
Carbon—about .05% maximum
Silicon—about 0 to 1%
Columbium—about 0 to 1%
Iron—remainder having thereon a thin arc-stabilizing coating substantially of the following composition by weight:

Ttianium dioxide—65%
Manganese dioxide—20%
Calcium oxide—15%

References Cited by the Examiner

UNITED STATES PATENTS

| | | | |
|---|---|---|---|
| 2,436,867 | 3/48 | Lee | 117—205 |
| 2,818,353 | 12/57 | Ludwig | 117—205 |
| 2,883,306 | 4/59 | Cotter | 75—128 |
| 2,894,833 | 7/59 | Linner et al. | 75—128 |

OTHER REFERENCES

Alloy of Iron Research Monograph Series, Grange et al., 1957, John Wiley & Sons Inc., N.Y., Ta 464 B6, pp. 232 and 277 relied on.

RICHARD D. NEVIUS, *Primary Examiner.*